J. KILMER.
Plow-Fender.
No. 45,454.   Patented Dec 13, 1864.
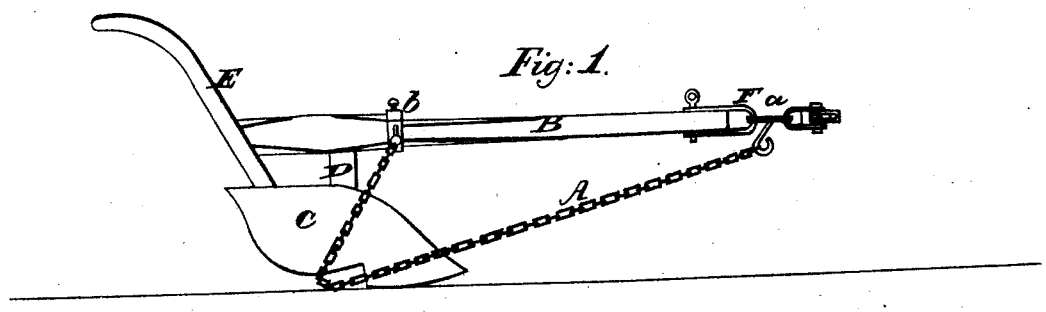
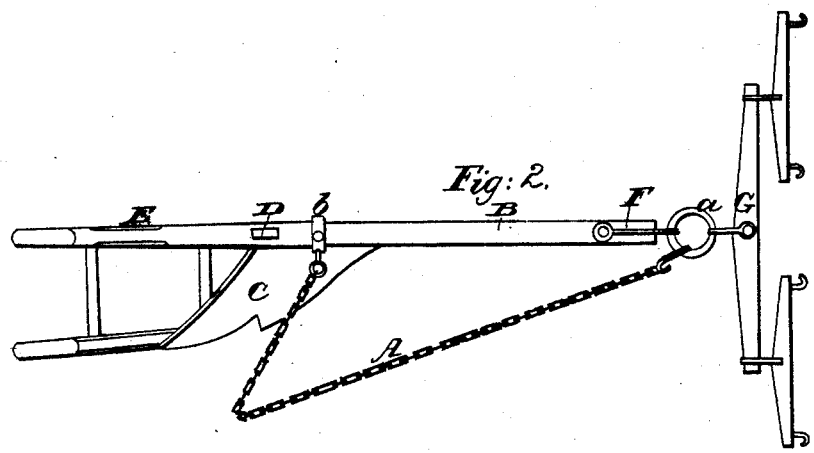

UNITED STATES PATENT OFFICE.

JOSIAH KILMER, OF COBLESKILL, NEW YORK, ASSIGNOR TO HIMSELF AND AUGUSTUS KILMER, OF SAME PLACE.

DEVICE FOR PLOWING IN STUBBLE.

Specification forming part of Letters Patent No. 45,454, dated December 13, 1864.

*To all whom it may concern:*

Be it known that I, JOSIAH KILMER, of Cobleskill, in the county of Schoharie and State of New York, have invented a new and Improved Plow; and I do hereby declare that the following is a full, clear, and exact description thereof, which will enable others skilled in the art to make and use the same, reference being had to the accompanying drawings, forming a part of this specification, in which—

Figure 1 represents a side elevation of this invention; Fig. 2, a plan or top view of the same.

Similar letters of reference indicate like parts.

This invention consists in the employment of a drag-chain extending from a ring or sleeve attached to the beam over the share to the evener or double-tree, or to a ring connecting said evener or double-tree with the clevis, and operating, in combination with the plowshare, in such a manner that, by the action of said chain, cornstalks, weeds, grass, &c., are turned in under the furrow and covered up by the earth while plowing, and the ground is left in proper condition for planting.

From the nature of this invention it will be readily understood the same is particularly applicable to plows used for breaking up new land or land previously planted with corn or other similar plants. In plowing land of this description with an ordinary plow the cornstalks, grass, weeds, or other plants growing on the same are turned over and left uncovered on the surface of the ground. In this case the stalks, weeds, &c., interfere seriously with the operation of sowing or planting; and, furthermore, the beneficial effect obtained from said plants when left to decay by covering them up with earth is lost. These disadvantages are avoided by the application of the drag-chain A to the plow-beam B.

The plow is constructed in the ordinary manner, with a furrowing-share, C, which is secured to the beam by the standard D and handles E. The beam B is furnished at its front end with a clevis, F, to which the double-tree G is attached by a ring, *a*, or in any other suitable manner, and the chain A is connected to the beam by means of a staple fastened in a sleeve, *b*. This sleeve is secured to the beam near the standard D and over the plowshare, and the chain extends from the staple in the same either to the end of the double-tree or to the ring connecting the same with the clevis, as shown in the drawings. As the plow is drawn along the chain drags on its side, and by its action stalks, grass, weeds, or any other impurities are drawn into the furrow and covered up as the ground is turned over by the share, and after the plowing is finished, the land remains in a proper condition for sowing or planting. All the stalks, weeds, &c., are turned under, and in decaying they form a valuable manure, which increases the fertility of the land.

It is obvious that the chain A can be attached to a plow of any suitable construction; and if a gang-plow is used two or more chains would have to be attached to it—one to each share.

I claim as new and desire to secure by Letters Patent—

The application to a plow-beam, B, and double-tree G of a drag-chain, A, substantially in the manner and for the purpose set forth.

JOSIAH KILMER.

Witnesses:
RALPH BREWSTER,
WM. H. DAVIS.